(12) United States Patent
Niederer et al.

(10) Patent No.: US 11,644,827 B2
(45) Date of Patent: May 9, 2023

(54) METHOD FOR IMPROVING THE MEASURING PERFORMANCE OF AUTOMATION FIELD DEVICES

(71) Applicant: Endress+Hauser SE+Co. KG, Maulburg (DE)

(72) Inventors: Manfred Niederer, Sonthofen (DE); Stefan Robl, Hünxe (DE); Ervin Binkert, Möhlin (CH); Alexey Malinovskiy, Maulburg (DE); Heiko Oehme, Jena (DE); Zurab Khadikov, Bad Krozingen (DE); Ulrich Kaiser, Basel (CH)

(73) Assignee: Endress+Hauser Conducta GmbH+Co. KG, Maulburg (DE)

( * ) Notice: Subject to any disclaimer, the term of this patent is extended or adjusted under 35 U.S.C. 154(b) by 168 days.

(21) Appl. No.: 17/275,320

(22) PCT Filed: Aug. 15, 2019

(86) PCT No.: PCT/EP2019/071896
§ 371 (c)(1),
(2) Date: Mar. 11, 2021

(87) PCT Pub. No.: WO2020/052899
PCT Pub. Date: Mar. 19, 2020

(65) Prior Publication Data
US 2022/0050447 A1 Feb. 17, 2022

(30) Foreign Application Priority Data
Sep. 13, 2018 (DE) ..................... 10 2018 122 411.7

(51) Int. Cl.
*G05B 23/02* (2006.01)
*G05B 13/02* (2006.01)

(52) U.S. Cl.
CPC ....... *G05B 23/0283* (2013.01); *G05B 13/027* (2013.01); *G05B 23/0254* (2013.01)

(58) Field of Classification Search
CPC .............. G05B 23/0283; G05B 13/027; G05B 23/0254; G05B 23/024
See application file for complete search history.

(56) References Cited

U.S. PATENT DOCUMENTS 5,251,144 A * 10/1993 Ramamurthi ...... G05B 19/4065
706/904
5,554,273 A * 9/1996 Demmin ............ G01N 27/4163
204/406

(Continued)

FOREIGN PATENT DOCUMENTS

DE 10048826 A1 4/2002
DE 10114128 A1 9/2002

(Continued)

*Primary Examiner* — Mohammad K Islam
(74) *Attorney, Agent, or Firm* — Mark A. Logan; Endress+Hauser (USA) Holding, Inc.

(57) ABSTRACT

Disclosed is a method for improving the measuring performance of automation field devices, wherein each of the field devices determines a process variable using a measuring algorithm and is exposed to measurable environmental influences. The method includes capturing the calibration data of the field devices and capturing an item of environmental information of the field devices at defined time intervals; storing the environmental information, the calibration data, and a time stamp in a database; selecting a group of field devices which determine a process variable using the same measuring algorithm and which are exposed to the same environmental influences; correlating the environmental information and calibration data captured over time; creating a mathematical model relating the calibration data and the environmental information; adapting the measuring algo- (Continued)

rithm on the basis of the model; and transmitting the adapted measuring algorithm to all field devices in the group.

12 Claims, 1 Drawing Sheet

(56) References Cited

U.S. PATENT DOCUMENTS

| | | | | |
|---|---|---|---|---|
| 2003/0083756 | A1* | 5/2003 | Hsiung | G05B 23/0221 |
| | | | | 700/28 |
| 2008/0015814 | A1 | 1/2008 | Harvey et al. | |
| 2016/0142160 | A1 | 5/2016 | Walker et al. | |
| 2016/0370334 | A1* | 12/2016 | van Tol | G01N 33/0008 |
| 2017/0298759 | A1* | 10/2017 | Masuda | F02C 9/00 |
| 2018/0231969 | A1* | 8/2018 | Noda | G05B 23/0283 |
| 2020/0288218 | A1* | 9/2020 | Cates | G01N 33/0036 |
| 2021/0076229 | A1* | 3/2021 | Rost | H04L 41/0803 |

FOREIGN PATENT DOCUMENTS

| | | |
|---|---|---|
| DE | 102015113756 A1 | 2/2017 |
| DE | 102016123338 A1 | 6/2018 |

* cited by examiner

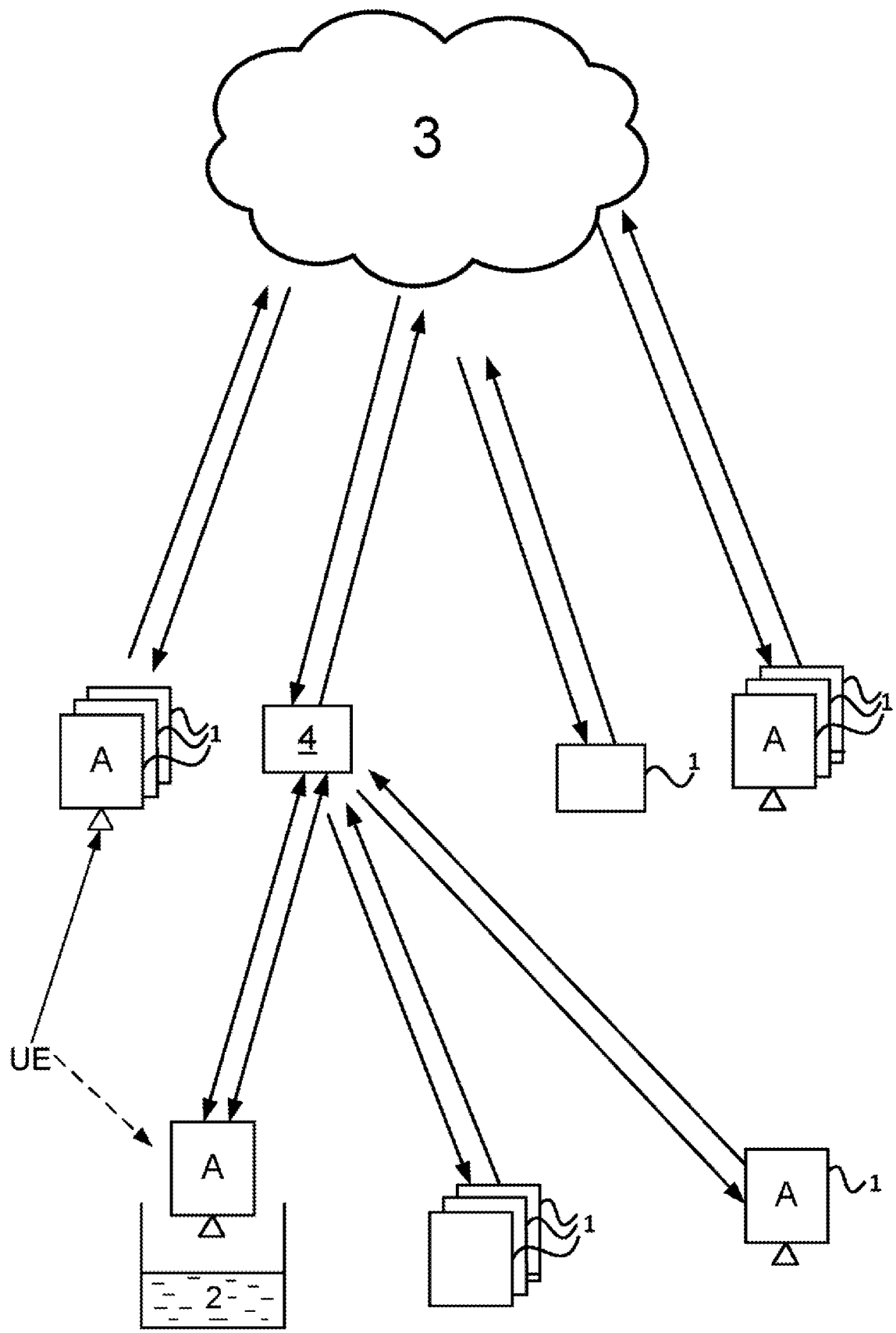

METHOD FOR IMPROVING THE MEASURING PERFORMANCE OF AUTOMATION FIELD DEVICES

CROSS-REFERENCE TO RELATED APPLICATIONS

The present application is related to and claims the priority benefit of German Patent Application No. 10 2018 122 411.7, filed on Sep. 13, 2018 and International Patent Application No. PCT/EP2019/071896, filed on Aug. 15, 2019, the entire contents of which are incorporated herein by reference.

TECHNICAL FIELD

The invention relates to a method for improving the measuring performance of automation field devices.

BACKGROUND

In automation systems, especially process and factory automation systems, field devices are frequently used which serve to capture and/or influence process variables. Sensors, which are integrated, for example, into fill-level measuring devices, flow meters, pressure and temperature measuring devices, pH-redox potential meters, conductivity meters, spectrometers, etc., that capture the corresponding process variables of fill-level, flow, pressure, temperature, pH level, conductivity, and chemical composition of the medium, are used for capturing process variables of a gaseous, liquid, or solid medium. Actuators, such as, for example, valves or pumps, are used to influence process variables. The flow rate of a fluid in a pipeline section or a fill-level in a container can thus be altered by means of actuators. Field devices, in principle, refer to all devices which are process-oriented and which supply or process process-relevant information. In the context of the invention, field devices are also understood to mean remote I/O's, radio adapters, and general devices that are arranged in an automation system. A variety of such field devices are manufactured and marketed by the Endress+Hauser company.

In industrial plants, the communication between at least one higher-level control unit and the field devices generally takes place using a bus system such as, for example, Profibus® PA, Foundation Fieldbus®, or HART®. The bus systems can be designed as both wired and wireless. The higher-level control unit is used for process control, process visualization, process monitoring, and the commissioning and operation of the field devices, and is also referred to as a configuration/management system. It has also become known to equip field devices with Internet interfaces for communication and/or energy supply.

Automation field devices are increasingly equipped with a near-field communications interface. A corresponding near-field communications interface (NFC interface) is preferably a standardized interface such as a Bluetooth or a Bluetooth Low Energy (BLE) interface. Using a corresponding app, the field devices can then be operated by means of commercially available communications tools (smartphone, tablet, laptop, etc.).

In the context of the invention, the term, "operating a field device," is to be understood as meaning the display of configuration, parameterization, measurement and status data, or other data relating to the field device, as well as the parameterization or configuration of the field device within the context of a startup or within the context of a service use. Furthermore, operation may include transferring a firmware or software update to the field device.

With field devices, it is possible to exchange the firmware. For this purpose, flash memories or EEPROM's are erased and rewritten using special methods. "Flashing" enables updating, troubleshooting, as well as retrofitting additional functions. Furthermore, it is repeatedly necessary to exchange measuring programs which are intended for the individual field device types, in order to troubleshoot, improve, or add functions to the corresponding field devices.

Measuring programs or measuring algorithms are loaded into the field device by the service technician using firmware updates directly at the field device, e.g., using a proprietary service interface or using a commercially available, near-field communications interface, such as Bluetooth Low Energy. Alternatively, it has become known to perform the update using a higher-level control unit such as a fieldgate of the Endress+Hauser group of companies. After transferring the new measuring algorithm or after updating the firmware, the field device must be calibrated—if necessary, several times.

Stress parameters, which a field device is continuously or cyclically exposed to at its measuring site and which can definitely have a considerable influence on the field device, are relatively difficult to get under control. Since the stress parameters can have a very negative effect on the measuring accuracy or the measuring performance of a field device, it is attempted to handle the problem by performing repeated calibrations of the field device. It goes without saying that this procedure is very time-consuming.

The stress parameters originate, in particular, from the physical or chemical conditions at the particular location where the field device is used. These may be variables such as temperature, pressure, vibrations/shocks, humidity, UV radiation, radiation exposure, etc. Of course, the nature of the medium itself also has a considerable influence; for example, the pH and aggressiveness and abrasiveness of the medium, etc., play an important role.

SUMMARY

The aim of the invention is to reduce the effort involved in calibrating field devices in order to ensure measurement performance.

The aim is achieved by a method for improving the measurement performance of automation field devices, wherein each of the field devices determines or monitors at least one physical or chemical process variable of a medium using a measuring algorithm, wherein each of the field devices is calibrated with specific calibration data tailored to the particular measurement task, and wherein each of the field devices is exposed to environmental influences that can be determined at its particular measurement position. The method comprises the following method steps:

capturing the calibration data of the field devices and/or capturing in each case at least one item of environmental information from the environment of the field devices at defined time intervals, storing the calibration data provided with a time stamp and environmental information in a data memory, selecting at least one group of field devices which determine a physical or chemical process variable using the essentially identical measuring algorithm and which correspond with respect to the captured environmental information within predetermined tolerance limits, correlating the calibration data captured over time and the environmental information captured over time, creating a mathematical model depicting the functional relationship between the calibration data and the captured environmental information, adapting the measuring algorithm on the basis of the determined mathematical model, transmitting the adapted measuring algorithm to all field devices of the selected group.

Generally speaking, the calibration effort of the field devices in the field—that is, in an automation system—is reduced in that a representative group of field devices is formed, the corresponding and previously mentioned data of the field devices of this group are analyzed, and the results of the analysis, i.e., the adapted measuring algorithm and possibly also the underlying mathematical model, are transmitted to all field devices of the group.

The advantages are, in particular, that the measurement performance of the individual field devices is improved. In the ideal case, recalibrations in the field become completely superfluous, so that the service effort is considerably reduced.

What are to be understood as field devices in conjunction with the invention has already been explained in the introduction to the description. This will not be repeated here. In particular, physical or chemical measured variables which have an influence on the field device, especially on the aging of the field device, are used as environmental information. The environmental information can be determined quantitatively and/or qualitatively. Quantitatively means in this context that the variables of measuring devices are measured; qualitatively means that their effects on the field devices are determined with sufficient accuracy. An example which may be mentioned here is a temporarily operated pump which causes slight, medium, or strong vibrations during operation.

According to a development of the method according to the invention, the calibration data and the environmental information are stored in the database. Given the large quantity of data which are sometimes determined and collected worldwide at different positions, this is preferably a cloud-enabled database.

Against the backdrop of the "Industrial Internet of Things (IIoT)" and "Industry 4.0", cloud-enabled databases for storing and processing large quantities of data (big data) which originate from industrial automation systems are becoming increasingly important. A database which is compatible with cloud computing technology is termed a cloud-enabled database. In this case, cloud computing is understood to be the processing and storage of information and the access to the stored information using the Internet.

To access a cloud-enabled database and exchange the data, so-called interfaces for application programming (application program interface, or "API" for short) are used. These define the permissible commands and types of access to the cloud-enabled database. Prior to access, the API requires an authentication of the user. This authentication is usually realized using a key (a so-called "API key").

Although the cloud-enabled database may be considered the preferred solution, it is of course also possible for the database to be assigned to an edge device, one of the field devices, or a local server. Moreover, an edge device ensures in particular the communication between the field devices, arranged in a defined zone of an automation system, and at least one internal or external server. It thus has the function of an intermediate data collector and possibly a translator of one communications protocol to another—for example, between a field bus protocol and an Internet/Intranet protocol.

It is considered advantageous in connection with the method according to the invention if the mathematical model for creating an adapted measuring algorithm is created using the methods of machine learning. In particular, it is provided that the mathematical model be created by using at least one neural network. Alternative embodiments of the method according to the invention produce the mathematical model by using the nearest neighbor method, by using decision trees, and/or by using a support vector machine. Further variants which can be used in conjunction with the solution according to the invention are the methods of linear or nonlinear regression, ensembles, naive Bayes, or logistic regression. The adapted measuring algorithm is preferably created in a cloud application.

The calibration data and the environmental information of the field devices and/or the adapted measuring algorithm are transmitted to the field devices of the selected group wired or wirelessly. If a cloud solution is used and the field devices have suitable interfaces, a direct exchange using the Internet/Intranet is possible. Otherwise, an edge device is used. It goes without saying that the exchanged data and information are transmitted as encrypted for safety reasons.

The method according to the invention as such or in one of its different embodiments is preferably not applied only once to the field devices. Rather, it is provided that the individual method steps of the method according to the invention be repeated cyclically or iteratively. The data, collected in subsequent calibration and/or measurement cycles, of a selected group of field devices which are used under comparable environmental and measurement conditions are employed to check the mathematical model. Optionally, the adapted measuring algorithm is verified and/or re-adapted.

In conjunction with the method according to the invention, it is considered particularly advantageous if statements relating to the residual remaining service life of individual field devices and/or the remaining service life of the field devices installed in an automation system are made on the basis of the calibration data and the environmental information. Since at least all dominant influencing variables on each of the selected groups of field devices are known, it is possible to reliably predict the remaining service life of the field devices in the individual groups to a great extent.

Moreover, the sufficiently well-known remaining service life of the field devices or the reliable knowledge of the environmental influences on the service life/lifetime of the field devices makes it possible for field device developers to draw conclusions as to which improvements are sensible and necessary in future new or further developments of field devices.

BRIEF DESCRIPTION OF THE DRAWINGS

The invention is explained in greater detail with reference to FIG. 1.

FIG. 1 shows a schematic representation of the individual method steps of an advantageous embodiment of the method according to the invention for improving the measurement performance of automation field devices 1.

DETAILED DESCRIPTION

The field devices 1 are installed in different automation systems-possibly, in automation systems distributed worldwide. Each of the field devices 1 is designed such that it captures at least one physical or chemical process variable of a medium 2 using a correspondingly designed sensor element and determines or monitors it using a defined measuring algorithm. Each of the field devices 1 is calibrated with specific calibration data according to the particular measurement task. Furthermore, each of the field devices 1 is exposed at its particular measuring position to environmental influences that can be measured quantitatively and/or qualitatively.

In a first step, the calibration data of the field devices 1 and/or suitable (i.e., influencing the measurement performance of the field device) environmental information are collected from the environment of the field devices 1 at defined time intervals. The time intervals are measured such that the data reflect changes in environmental conditions within predetermined tolerances.

In a second step, the calibration data provided with a time stamp, and environmental information are stored in a database 3. Since big data analyses are preferably used, the database is a cloud-enabled database. Either the field devices supply the calibration data and environmental information directly to the cloud-enabled database, or the data are collected, e.g., by an edge device 4 integrated into the networks of the automation systems, and then forwarded to the database 3. Due to the switching function of an edge device, the field devices 1 do not have to be equipped with an Internet interface. If Internet interfaces are present at each of the field devices 1, the data can also be transferred directly to the database.

All of the field devices 1 belonging to a group A, for example, are then selected by a software program. Group A is characterized in that the field devices listed here belong to the same field device type and determine the same physical or chemical process variable using basically the same measuring algorithm. Furthermore, the captured environmental information of all field devices 1 of the selected group A coincide within predetermined tolerance limits.

In a fourth step, the calibration data captured over time and the environmental information of the field devices 1 of group A captured over time are used to generate a mathematical model. The mathematical model depicts the functional relationship between the calibration data and the captured environmental information. Suitable methods from the field of artificial intelligence have already been mentioned above. A textbook on the topic of AI has been published, for example, by Prof. Ertl (Grundkurs Künstliche Intelligenz, 4th edition).

In a fifth method step, the measuring algorithm of the field devices 1 of the selected group A is adapted or adjusted, based upon the generated mathematical model. Finally, the adapted measuring algorithm is transmitted to all field devices 1 of the selected group A. In the future, this then replaces the measuring algorithm originally present in the field devices 1 of the selected group A. Field devices 1 provided in the future will already be equipped with the adapted measuring algorithm during production.

Since all influencing variables on all field devices of the different selected groups of field devices 1 are known, it is possible to reliably predict the remaining lifetime of the field devices 1 in the individual groups to a great extent.

Moreover, the sufficiently precise knowledge of the remaining service life of the field devices 1 or the reliable knowledge of the environmental influences on the service life of the field devices 1 makes it possible for field device developers to draw conclusions as to which improvements are sensible and necessary for future new or further developments of field devices 1.

The invention claimed is:

1. A method for improving a measuring performance of automation field devices, wherein each of the field devices determines or monitors at least one physical or chemical process variable of a medium using a measuring algorithm, wherein each of the field devices is tailored to a particular measuring task, is calibrated using specific calibration data, and is exposed to measurable environmental influences at its particular measuring position, the method comprising:
   capturing the calibration data of the field devices and capturing in each case at least one item of environmental information from the environment of each respective field device at defined time intervals;
   storing the captured at least one item of environmental information, the calibration data, and a time stamp in a data base;
   selecting a group of field devices that determine a physical or chemical process variable using the identical measuring algorithm and which correspond with respect to the captured at least one item of environmental information;
   correlating the calibration data captured over time and the captured at least one item of environmental information;
   creating a mathematical model depicting the functional relationship between the captured calibration data and the captured at least one item of environmental information;
   adapting the measuring algorithm of the group of field devices on the basis of the determined mathematical model; and
   transmitting the adapted measuring algorithm to all field devices of the selected group.

2. The method according to claim 1,
   wherein physical or chemical measured variables which influence an aging of the measuring devices are used as the environmental information.

3. The method according to claim 1,
   wherein the database is assigned to a cloud application, an edge device, which ensures communication between the field devices arranged in a defined area of an automation system and at least one external server, one of the field devices, or a local server.

4. The method according to claim 1,
   wherein the mathematical model is created using methods of machine learning.

5. The method according to claim 1,
   wherein the mathematical model is created using at least one neural network.

6. The method according to claim 1,
   wherein the mathematical model is created by using a nearest neighbor method, by using decision trees, and/or by using a support vector machine.

7. The method according to claim 1,
   wherein the adapted measuring algorithm is created in a cloud application.

8. The method according to claim 1,
   wherein the calibration data and the at least one item of environmental information, and/or the adapted measuring algorithm are transmitted to the field devices of the selected group wired or wirelessly.

9. The method according to claim 1,
   wherein the calibration data and the at least one item of environmental information, and/or the adapted measuring algorithm are transmitted as encrypted to the field devices of the selected group.

10. The method according to claim 1,
wherein the method steps of the method are repeated cyclically or iteratively so that the mathematical model and, subsequently, the adapted measuring algorithm are verified and/or adapted on the basis of subsequent calibrations of the field devices of the selected group.

11. The method according to claim 1,
wherein statements relating to a remaining residual service life of individual field devices and/or a remaining service life of the field devices installed in an automation system are made on the basis of the calibration data and the environmental information.

12. The method according to claim 1,
wherein conclusions regarding an improvement of future new developments of field devices are drawn on the basis of the environmental influences on the service life of the field devices.

\* \* \* \* \*